(12) United States Patent
Quarre et al.

(10) Patent No.: US 8,732,729 B2
(45) Date of Patent: May 20, 2014

(54) UNIFIED DRIVING METHOD AND UNIFIED DRIVER APPARATUS

(75) Inventors: Christophe Quarre, Shanghai (CN); Maoping Weng, Shanghai (CN); Zhe Wu, Shanghai (CN)

(73) Assignee: STMicroelectronics R&D (Shanghai) Co., Ltd., Shanghai (CN)

( * ) Notice: Subject to any disclaimer, the term of this patent is extended or adjusted under 35 U.S.C. 154(b) by 1177 days.

(21) Appl. No.: 12/650,279

(22) Filed: Dec. 30, 2009

(65) Prior Publication Data

US 2010/0169898 A1    Jul. 1, 2010

(30) Foreign Application Priority Data

Dec. 30, 2008  (CN) .......................... 2008 1 0190546

(51) Int. Cl.
  *G06F 3/00*  (2006.01)
  *G06F 9/44*  (2006.01)
  *G06F 9/46*  (2006.01)
  *G06F 13/00* (2006.01)

(52) U.S. Cl.
  USPC ....................................................... 719/323

(58) Field of Classification Search
  USPC ....................................................... 719/323
  See application file for complete search history.

(56) References Cited

U.S. PATENT DOCUMENTS

| | | | | |
|---|---|---|---|---|
| 5,604,843 A | * | 2/1997 | Shaw et al. | ..................... 358/1.1 |
| 6,289,396 B1 | * | 9/2001 | Keller et al. | .................. 719/323 |
| 6,535,903 B2 | * | 3/2003 | Yates et al. | ..................... 718/100 |
| 6,831,635 B2 | | 12/2004 | Boyd et al. | |
| 7,028,309 B2 | * | 4/2006 | Ward et al. | ..................... 719/328 |

FOREIGN PATENT DOCUMENTS

WO   WO0041117   *   7/2000   .............. G06F 17/60

OTHER PUBLICATIONS

"Gshark-Takumi Technology | Takumi Corporation," http://www.gshark.com/en/index.html, retrieved on Dec. 30, 2009, 1 page.
"Welcome to NVIDIA—World Leader in Visual Computing Technologies," http://www.nvidia.com/page/home.html, retrieved on Dec. 30, 2009, 1 page.

* cited by examiner

*Primary Examiner* — Emerson Puente
*Assistant Examiner* — Kimbleann Verdi
(74) *Attorney, Agent, or Firm* — Seed IP Law Group PLLC

(57) ABSTRACT

The present invention provides a technical solution for a unified driver used in a handheld device. An embodiment of the technical solution may comprise a unified driving method used in a handheld device, which method may comprise: determining driver types of currently installed hardware; setting a current dispatch table on the basis of the driver type and a unified dispatch table suitable for multiple hardware and driving corresponding hardware or software by calling the current dispatch table.

17 Claims, 9 Drawing Sheets

| Unified hardware | Functions | Driver operations | Address pointers |
|---|---|---|---|
| | TnL | TnL's driver operation A1 | Address pointer 1 |
| | Rasterizer | Rasterizer's driver operation A2 | Address pointer 2 |
| | Back-end | Back-end's driver operation A3 | Address pointer 3 |

*FIG. 7A*

| First hardware | Functions | Driver operations | Address pointers |
|---|---|---|---|
| | TnL | TnL's driver operation A1 | Point to the software performance address a |
| | Rasterizer | Rasterizer's driver operation A2 | Point to the software performance address a and the hardware operation address b |
| | Back-end | Back-end's driver operation A3 | Point to the hardware operation address b |

*FIG. 7B*

| | Functions | Driver operations | Address pointers |
|---|---|---|---|
| Second hardware | TnL | TnL's driver operation A1 | Point to the hardware operation address c |
| | Rasterizer | Rasterizer's driver operation A2 | Point to the software performance address a and the hardware operation address c |
| | Back-end | Back-end's driver operation A3 | Point to the hardware operation address c |

UNIFIED DRIVING METHOD AND UNIFIED DRIVER APPARATUS

BACKGROUND

1. Technical Field

The present invention relates to the field of device driver technology and, more particularly, to a driving method used in handheld devices.

2. Description of the Related Art

With the development of various hardware components and peripherals used in handheld devices (such as mobile phones, portable game consoles, portable computers, personal multimedia devices, etc.), more and more functions can be performed by means of these hardware components and peripherals. For example, multi-mode touch screens, real-time video, and GPS capabilities are all relatively new components and peripherals found in portable handheld devices.

In some cases, a "component" is embedded in the handheld system itself and is distinguishable from a "peripheral," which may be incorporated into the system but is not necessarily an integral part of the device's primary function. Typically, a "module" can be either a component or a peripheral. Nevertheless, the terms "component," "peripheral," and "module" are often used interchangeably and share enough commonality that their use herein is interchangeable. One common feature of components, peripherals, modules, and many other electronic hardware elements is the need for a device driver.

As is well known, device drivers are usually custom-designed in software to expose the controllable features of the underlying hardware for which they were designed. The device driver exposes a common application programming interface (API) known to higher layers of software, often as various sets of data structures and software function calls. When the higher layers of software load or otherwise manipulate the data structures, or when the higher layers of software make software function calls, the device driver translates the requests of the higher layers of software into instructions to the underlying hardware. Accordingly, since many manufacturers may make many pieces of hardware capable of performing the same or a similar function, different, customized device drivers are needed for each of the different hardware pieces.

In fixed computer installations, in a conventional personal computer (PC) for example, some software makers have begun to provide a unified device driver architecture for a 3D graphics implementation. In such implementations, a graphics "card" is installed on a PC motherboard; often in a standardized peripheral component interconnect (PCI) port or a standardized accelerated graphics port (AGP). PC implementations are well suited to a unified device driver architecture because of the high degree of standardization of computer hardware and operating system software.

FIG. 1 illustrates a hardware/software block diagram representing how a unified driver architecture may be implemented for various hardware graphics processing units (GPU's) and their associated software drivers.

In FIG. 1, a timeline 102 shows the progression of weeks, months, or years. A driver roadmap 104 shows various releases of software drivers and a GPU roadmap 106 shows various releases of hardware. At a first point on the timeline 102, a first GPU core 110 is released at the same time as a corresponding first software driver 108. The first software driver 108 has a unified driver applications programming interface (API) 112 that is compatible with a corresponding unified driver hardware abstraction layer (HAL) 114. As time passes, graphics card makers release additional software drivers 116, 124 having a unified driver API 118, 126 respectively. At the same time, at overlapping times, or at different times, graphics card makers release additional GPU cores 120, 128, each having a corresponding HAL 122, 130.

As illustrated by compatibility arrows in FIG. 1, the substantial overlap in the unified driver software APIs and unified driver HALs permit many versions of software drivers to work cooperatively with many versions of GPUs. That is, the HALs and APIs of the various hardware and software releases permit complete backward compatibility and sometimes forward compatibility. The first software driver 108 is compatible with a first GPU core 110. A second software driver 116 release is compatible with first GPU core 110 and also with a second GPU core 122, which may not even be available when the second software driver 116 becomes available. A third software driver 124 release is compatible with all of the hardware GPU cores 114, 122, 130 that have been made previously.

The first unified software driver 108 has forward compatibility with the next HAL 120, but not with the subsequent HAL 128 release. That is, forward compatibility is desirable, but not guaranteed and may be limited to one or even no future HALs.

Architectural standardization of both system software hardware interfaces permits the unified driver applications of PC 3D graphics implementations. As shown in FIG. 1, system software 132, e.g., operating systems, provide a common architecture onto which software drivers can be designed. It is very common for the operating system and application layer software to determine the functionality provided by a software driver. Thus, the functionality of the driver is integrated throughout the driver.

Similarly, well-accepted hardware interfaces are present in PC architecture such that GPU designs in PCs are often substantially similar to each other. On one side of the GPU, interfaces such as hardware interface 134 have been formally or informally standardized and so are common to all GPU's. On the other side of each GPU, a substantially common HAL can be designed to work cooperatively with the unified driver software layer of the software driver. That is, since there is substantial commonality of features between software drivers that is guided by system software 132, there is also substantial commonality of the software driver API layer to the unified driver HAL layer interface.

BRIEF SUMMARY

It is an object of the present invention to provide a unified driving method and apparatus that is applicable across a wide range of devices and software.

A unified device driving method executed in a handheld electronic device operates as follows. Determining a driver type, the driver type representative of a currently available hardware module on the handheld device. Then, loading, in response to determining said driver type, a plurality of current dispatch table address pointers into a unified dispatch table. The unified dispatch table provides sufficient storage for at least two pointers for each of a plurality of different hardware configurations. The current dispatch table address pointers from the unified dispatch table are then available to a central processing unit. These address pointers are used to identify functions that drive currently available hardware.

The method may further include obtaining a plurality of current dispatch table address pointers for a plurality of different hardware configurations supported by said unified device driving method; and generating said unified dispatch table using said plurality of current dispatch table address pointers. The obtaining the plurality of current dispatch table address pointers may include obtaining at least two sets of address pointers to functions wherein each set of address pointers represents addresses to functions accessible by each of the plurality of different hardware configurations respectively. The unified dispatch table may be organized according to a function column and an address pointer column, wherein the function column provides for storage of an identifier for each function accessible by each of the plurality of different hardware configurations respectively, and the address pointer column provides for storage of address pointers to objects, the objects implementing said functions. Determining the driver type representative of the currently available hardware module may include at least one of: determining that functions performed by the unified device driving method are performed fully in the currently available hardware module; determining that functions performed by the unified device driving method are performed in a combination of hardware and software; and determining that functions performed by the unified device driving method are performed fully in software without the participation of hardware. Loading the current dispatch table may include setting a first current dispatch table address pointer to an address of a first function when the first function is executable fully in the currently available hardware module; setting a second current dispatch table address pointer to an address of a second function when the second function is executable in a combination of the currently available hardware module and software; and setting a third current dispatch table address pointer to an address of a third function when the third function is executable fully in software. The unified dispatch table may be further organized according to a driver operation column, wherein the driver operation column provides for storage of identifiers indicating driver operations corresponding to all functions supported by the unified driving method such that the plurality of different hardware configurations share corresponding driver operations indicated by the identifiers. The unified device driving method may be a three-dimensional (3D) graphics processing method. The loading may include loading a current dispatch table address pointer to a transform and lighting (TnL) function; loading a current dispatch table address pointer to a rasterization function; and loading a current dispatch table address pointer to a back-end processing function. The determining and the loading may include uploading a unified dispatch table from a memory.

A mobile device may be summarized as including a hardware module, the hardware module controllable with software; a memory having an area for instructions and an area for data structures; and a central processing unit (CPU) operable to execute instructions stored in the memory area for instructions, the instructions forming a unified driver configured to control the hardware module when the CPU executes the instructions, the control including: initializing a unified dispatch table configured in the memory area for data structures, the unified dispatch table representing a plurality of columns of function identifiers and a plurality of columns of address pointers; loading the unified dispatch table with at least one set of function identifiers in the memory area for data structures associated with the columns of function identifiers; and loading the unified dispatch table with at least one set of address pointers in the memory area for data structures associated with the columns of address pointers, wherein each address in the set of address pointers represents an address of at least one function executable to control the hardware module.

The mobile device may further include a dispatch manager implemented in a subset of the instructions stored in the memory area for instructions, the dispatch manager having instructions to further control the hardware module when the CPU executes the instructions, the further control including: accessing the unified dispatch table; processing requests and directions passed via a unified driver applications programming interface (API); retrieving information from a software rendering module; retrieving information from a hardware capabilities module; passing commands to the software rendering module; and passing commands to the hardware module. Processing requests and directions may include generating 32-bit commands and passing commands may include passing the 32-bit commands through a command interface. The mobile device may further include a dispatch manager implemented in a subset of the instructions stored in the memory area for instructions, the dispatch manager having instructions to further control the hardware module when the CPU executes the instructions, the further control including: using a function identifier as an index into the unified dispatch table; retrieving an address pointer from the unified dispatch table; and retrieving a driver operation indicator from the unified dispatch table. The further control may further include making the address pointer available to the CPU if the driver operation indicator is a fully software driver operation indicator; or making the address pointer available to the CPU and passing another address pointer to the hardware module if the driver operation indicator is a combination software and hardware driver operation indicator; or passing the address pointer to the hardware module if the driver operation indicator is a fully hardware driver operation indicator. The mobile device may further include a dispatch manager implemented in a subset of the instructions stored in the memory area for instructions, the dispatch manager having instructions to further control the hardware module when the CPU executes the instructions, the further control including: forming a global rendering context in the memory area for data structures, the global rendering context having pointers into the unified dispatch table; and passing the global rendering context as an input parameter to each function executable to control the hardware module. The global rendering context further may have pointers to global data structures accessible by the CPU. The loading may include accessing a first current dispatch table associated with a first potential hardware module; accessing a second current dispatch table associated with a second potential hardware module; and loading the unified dispatch table with pointers associated with the hardware module in response to accessing the first and second current dispatch tables. The unified driver may be a unified three-dimensional (3D) graphics processing driver. The unified three-dimensional (3D) graphics processing driver may implement an OpenGL/ES protocol.

A computer-readable medium whose contents configure a mobile device to provide unified driver functionality, by performing a method which may be summarized as including initializing a unified dispatch table, the unified dispatch table representing a plurality of columns of function identifiers and a plurality of columns of address pointers; loading the unified dispatch table with at least one set of function identifiers associated with the columns of function identifiers; loading the unified dispatch table with at least one set of address pointers associated with the columns of address pointers, wherein each address in the set of address pointers represents an address of at least one function executable to control the hardware module.

BRIEF DESCRIPTION OF THE SEVERAL VIEWS OF THE DRAWINGS

The novel aspects of the invention are set forth with particularity in the appended claims. The invention itself together with further objects and advantages thereof may be more readily understood with reference to the following detailed description of at least one preferred embodiment of the invention, taken in conjunction with the accompanying drawings, in which:

FIG. 7A is a schematic view of a unified dispatch table created using the method according to the embodiment of the present invention;

FIG. 7B is a schematic view of a current dispatch table set for hardware as currently installed hardware using the method according to the embodiment of the present invention;

DETAILED DESCRIPTION

Figure 1:
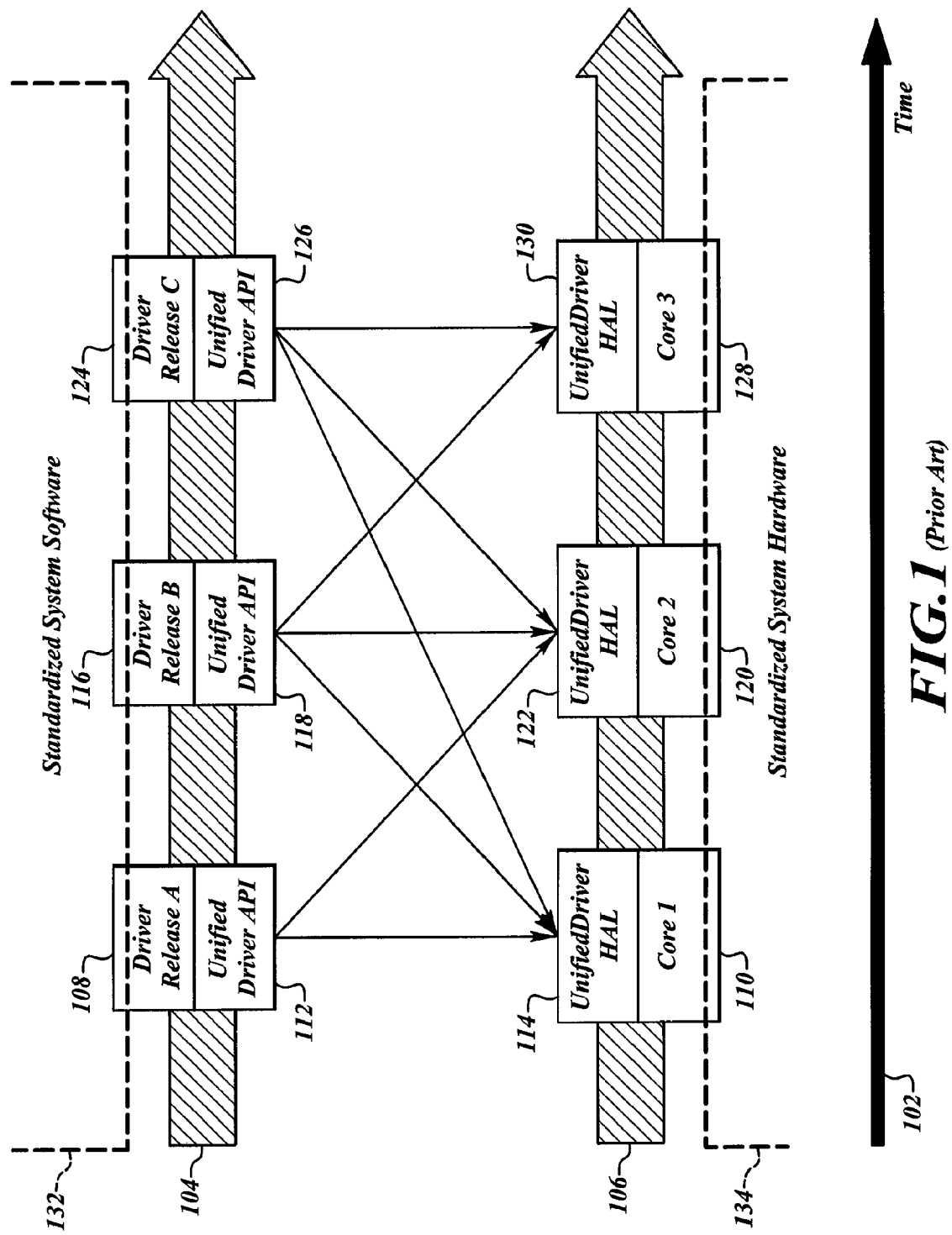
FIG. 1 illustrates a hardware/software block diagram representing how a unified driver architecture may be implemented for various hardware graphics processing units (GPUs) and their associated software drivers.

Mobile devices, also called handheld devices, are quite different from PCs. In general, mobile devices share little if any commonality between manufacturers. In many cases, this is a natural result of a high focus on device cost and battery life. In other cases, this is a result of the complex and nonstandard system on chip (SoC) processors used in mobile devices.

In order to make hardware and software interfaces common, additional overhead is necessary. The additional overhead includes extra communication lines, extra clock cycles, extra memory, extra software functions, and the like. The additional overhead adds cost to the device, and uses precious battery energy. Accordingly, most devices are custom-designed, even when a new mobile device is an improved family member to a previously released mobile device.

Hereinafter, a unified driving method and unified driver apparatus will be described in the context of three-dimensional (3D) graphics processing with reference to the accompanying drawings illustrating particular embodiments of the method and apparatus. However, those skilled in the art will appreciate that the unified driving method and unified driver apparatus are not limited to 3D graphics processing.

One feature now found in some handheld devices is a pipelined graphic engine for the acceleration of 3D graphics. In order to provide an engine for three-dimensional (3D) graphical rendering for handheld devices, relevant solutions for acceleration can be implemented fully in software, fully in hardware or in a combination of software and hardware. Therefore, since many manufacturers may offer graphic engine components, and since the components will have different hardware, different software, or different hardware/software combinations, different drivers must be designed in order to support them. Designing custom drivers for each different piece of hardware presents many challenges.

For example:

1) Each device driver corresponding to each hardware device needs to be tested and debugged. The testing and debugging results in relatively long development cycles. In turn, the long development cycle requires more time before release, which does not support rapid development of improved technologies.

2) Since different drivers need to be maintained on the basis of different hardware devices, maintenance costs are much higher.

3) A monolithic driver can run only on the hardware of a handheld device for which it was designed. As a result, it is difficult to switch among different hardware devices and accomplish the flexible allocation of hardware performance.

These and other challenges make it inefficient, difficult, and in some cases even impossible for a device driver to provide an desirable solution for any handheld device component including, for example, a 3D graphics rendering engine for handheld devices.

Until recently, most 3D applications in handheld devices were based completely on software acceleration. Now, however, 3D graphics engines built partially or even completely in hardware are starting to be developed.

Device drivers for these new 3D graphics engines can be separated into two parts: a hardware-independent part and a hardware-dependent part. Typically, in systems having 3D graphics processing, the hardware-independent part is used to manage graphics library (GL) states, and the hardware-dependent part is used to control forwarding of the GL states to the underlying graphics hardware.

Considering the development of a conventional pipelined graphics driver for the acceleration of 3D rendering for mobile device displays, various solutions can be implemented fully in software, fully in hardware or in a combination of software and hardware. In addition, conventional implementations of a graphics driver are typically custom-designed for each device. That is, each mobile device design has specified a particular driver model (fully software, fully hardware, or a combination of software and hardware), and a different driver is developed to match the mobile device's CPU, graphics hardware, display, operating system, memory layout, and the like.

The conventional practice of offering different drivers according to each mobile device implementation causes several problems. For example, creating a monolithic driver for each mobile device design will increase the time necessary for proper testing and debugging. As a result of long testing and certification cycles, the release of new products is slowed down. Individually designed monolithic drivers also lead to increased support costs. That is, problems encountered with one 3D acceleration driver implementation may or may not be reproduced in other implementations. Moreover, when new features are added into one 3D rendering engine or other driver layer, each of the different drivers would need to be upgraded and tested according to its particular design.

Designing mobile devices with custom, monolithic drivers also produces inflexibility in demands balancing. That is, one monolithic driver can run only on its particularly matched hardware. Once the design of the mobile device changes, or when different mobile device implementations are created, there is no consistent or efficient way to switch to another 3D driver without either making design tradeoffs or without accumulating additional design, test, and certification time. Such accumulation often leads to a reduction in performance and quality of the mobile device.

Accordingly, monolithic graphics drivers become a less desirable solution for 3D graphics rendering on a mobile device, but heretofore there has been no clear strategy for improving the weaknesses of monolithic drivers. The embodiments of a unified graphics driver discussed herein solve the problems caused by monolithic drivers.

During 3D graphics processing, common rendering functions include: Transform and Lighting (TnL) (also called Texture and Lighting or geometry), Rasterization, and Back-end (e.g., system housekeeping) processing. These functions can be implemented fully in hardware ("fully hardware driver"), e.g., using digital signal processing, or implemented in a combination of hardware and software ("partial hardware driver"), or implemented fully in software without the participation of hardware ("fully software driver"). The choice of which one of the three driver types to be implemented to perform the particular function generally depends on the design of the underlying hardware, if any.

Figure 2:
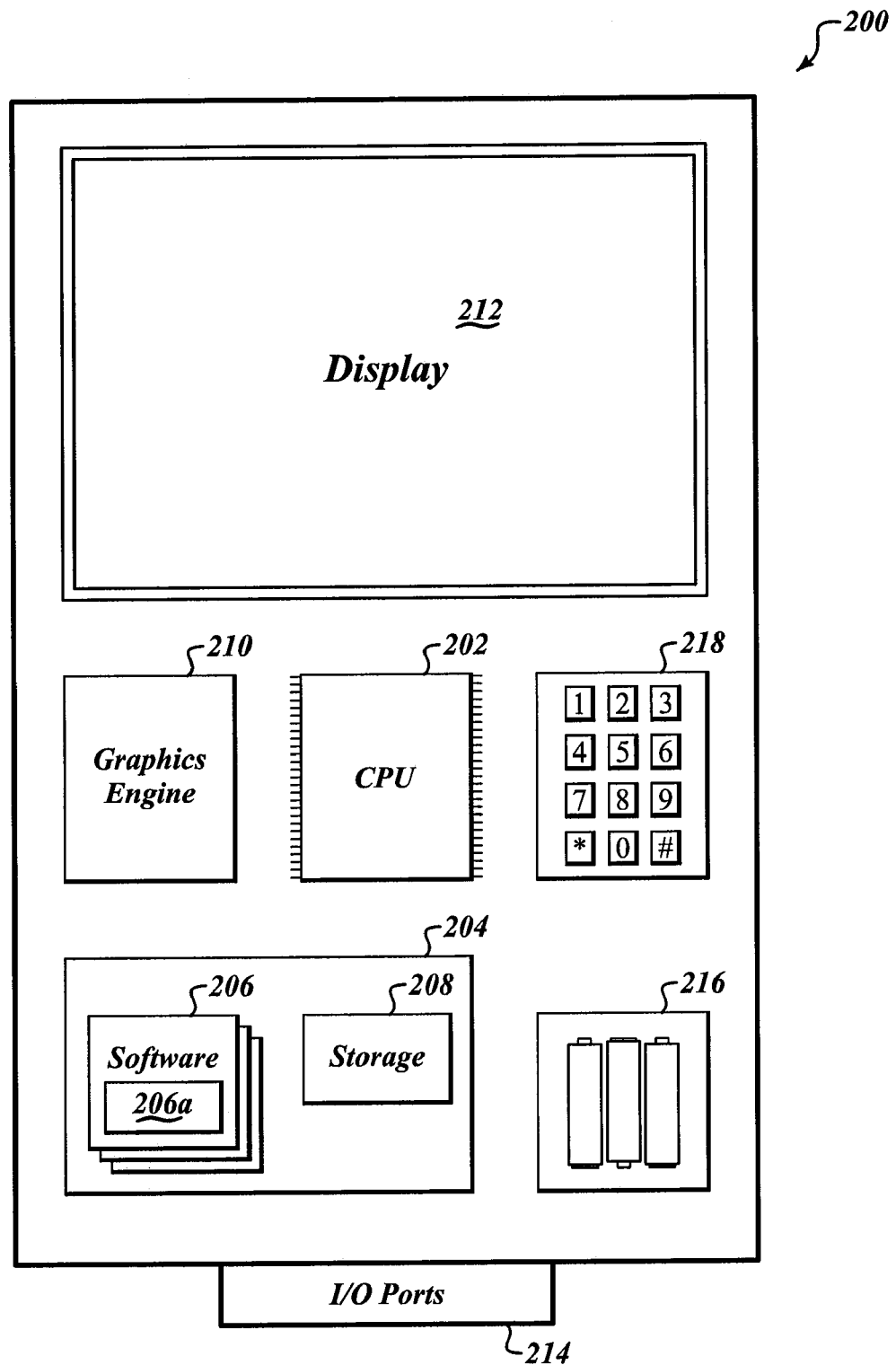
FIG. 2 illustrates several components of a mobile device.

FIG. 2 illustrates several components of a mobile device 200. The mobile device 200 may be a cellular telephone, a portable media player (PMP), a portable game console, a global positioning system (GPS), a handheld industrial electronic device, or the like. The mobile device 200 has at least one central processing unit (CPU) 202 which may be a scalar processor, a digital signal processor (DSP), a reduced instruction set (RISC) processor, or any other suitable processor.

The mobile device 200 also includes a volatile and/or non-volatile memory 204. The memory 204 stores instructions and data acted on by CPU 202. Memory 204 comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk drive (HDD), an optical disk drive, a floppy diskette, a flash memory device, a CD-ROM, and/or the like.

Inside memory 204, a particular collection of software instructions 206 are executed by CPU 202. The software instructions 206 generally control many of the operations of the mobile device 200, and a subset of software instructions 206a perform functions of a graphics driver. In some embodiments, the graphics driver 206a controls an optional hardware graphics engine 210. The hardware graphics engine 210 is resident in embodiments where graphics rendered on display 212 are produced in total or in part by a hardware graphics engine 210. In other cases however, there is no separate hardware graphics engine, and in such cases, the graphics driver 206a within software instructions 206 directs CPU 202 to create graphics that are displayed on display 212.

The software instructions of graphics driver 206a operatively configure hardware and other software in the mobile device 200 so that particular embodiments of a unified driver functionally perform as a fully software graphics driver, a partial hardware graphics driver, and a fully hardware graphics driver. Storage memory 208 may be used to implement data structures cooperatively created and maintained by the unified graphics driver 206a.

Storage memory 208 may be a file system, a flat memory architecture, a database, or any other method or combination known in the art for storing such information. Generally, some of the information in storage memory 208 is stored in a non-volatile way and some information is stored in a volatile way.

The mobile device 200 further has a collection of input/output ports 214 for passing data over short distances to and from the mobile device 200 or for coupling additional storage to the mobile device 200. For example, serial ports, USB ports, WiFi ports, Bluetooth ports, IEEE 1394 FireWire, and the like can communicatively couple the mobile device 200 to other computing apparatuses. Compact Flash (CF) ports, Secure Digital (SD) ports, thumb drive ports, and the like can couple a memory device to the mobile device 200 for reading and writing by the CPU 202.

Mobile device 200 has a battery 216. The battery supplies energy for the mobile device when a traditional, wired power source is unavailable or otherwise not connected.

Mobile device 200 has a user input mechanism 218. The user input mechanism 218 may include a keyboard, a touch screen, a motion sensor, a position sensor, a camera, or any other single input device or combination of input devices useful to provide direction into the mobile device 200. Generally, a unique software driver stored in software 206 configures each input mechanism to sense user input, and then the software driver provides data points that are acted on by CPU 202 under the direction of other software 206.

Graphics driver 206a may include a fully executable software program, a simple configuration data file, links to additional directions, or any combination of known software types. The unified graphics driver 206a may also be dynamically configured. That is, depending on the particular hardware and software configuration of the mobile device, the graphics driver 206a will update and configure itself cooperatively with storage 208 to create a fully operational unified driver.

The unified graphics driver 206a provides many advantageous features for the mobile device 200. The advantageous features are not found in the conventional methodology. For example, the unified graphics driver is dynamically configurable such that the execution of the unified driver 206a creates various software structures compatible with the hardware configuration of the mobile device 200. In contrast, a conventional graphics driver requires customization to the particular hardware that is resident and accessible on the mobile device 200. Accordingly, a common unified driver 206a can be created and loaded into the memory 204 of many different types of mobile device, but a conventional, customized driver must be developed for each type of mobile device.

Another advantage of the unified graphics driver 206a is that it is more reliable than the conventional methodology. For example, in a mobile device 200 having a hardware graphics engine 210, some circumstances may arise where the graphics engine 210 fails. In a conventionally configured mobile device, the failure of the graphics engine 210 hardware would generally render the mobile device inoperable. With a unified graphics driver 206a, however, the operation of the unified graphics driver 206a can identify the graphics engine 210 hardware failure and re-configure the graphics driver 206a as a fully software driver.

Figure 3:
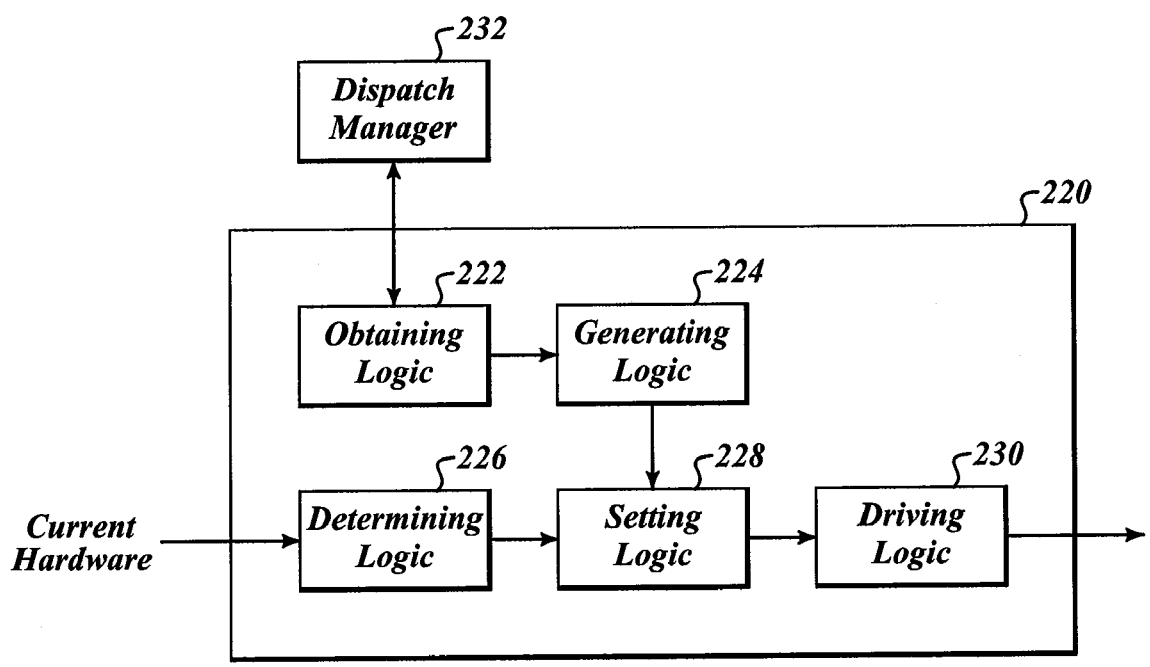
FIG. 3 is a schematic layout view of a unified driver apparatus according to an embodiment of the present invention.

An inner layout of a unified driver apparatus 220 according to an embodiment of the unified driving method and unified driver apparatus is described in conjunction with FIG. 3. In FIG. 3, a unified driver apparatus 220 may include several of the illustrated and inherent components of mobile device 200 of FIG. 2. For example, the unified driver apparatus 220 may include CPU 202, software 206 including graphics driver 206a as well as other instructions, storage 208, graphics engine 210, user input mechanism 218, internal buses, coprocessors, sensors, and the like. As shown in the non-limited embodiment FIG. 3, the unified driver apparatus 220 includes: obtaining logic 222, generating logic 224, determining logic 226, setting logic 228, and driving logic 230.

Cooperatively, a dispatch manager 232 may also be used to control the operation of the unified driver apparatus 220. In some cases, the dispatch manager 232 is part of the unified driver apparatus 220, but in other cases, the dispatch manager 232 resides in software 206 and directs operation of the unified driver apparatus 220 within a mobile device 200.

The obtaining logic 222 is configurable to obtain driver information related to multiple hardware circuits associated with the unified driver apparatus 220. In one embodiment, a structured software description of the underlying hardware is made on the basis that the unified driver 220 can support first hardware and second hardware, each capable of performing graphics processing. The obtaining logic 222 can then feed the driver information related to the first hardware and the second hardware to the generating logic 224.

The generating logic 224 creates a unified dispatch table useable by the driver to control multiple hardware configurations. For example, in one embodiment, the unified dispatch table includes two columns: a rendering function column and an address pointer column. The rendering function column is loaded with particular rendering function identifiers. The address pointer column is loaded with address pointers of objects driven to fulfill the particular rendering functions.

Some function identifiers may represent groupings of particular types of functions and other function identifiers may represent the individual procedures of the unified driver. In some cases, the function identifiers are used as indexes into the unified dispatch table to control the underlying hardware. For example, if a function identifier is known, then the function identifier can be used to retrieve an address pointer from the unified dispatch table. Depending on the type of unified driver model, the address pointer may represent a starting address of a software procedure to run on the local CPU, a hardware address to a particular hardware device, or some other address.

Information related to the type of hardware available may be obtained from the hardware layer or during other configuration. According to the type-of-hardware information, the address pointer column stores address pointers to software or hardware objects that can be called up to perform the available rendering functions (including TnL, rasterization, and back-end functions) for each hardware configuration.

The obtaining logic 222 and the generating logic 224 are preferred but not essential for the unified driver apparatus 220. For example, according to another embodiment of the unified driving method and unified driver apparatus, a unified dispatch table may be uploaded from memory or some other source. According to yet another example, a unified dispatch table may be manually loaded or automatically generated using development tools, computer equipment, or some other logic.

The determining logic 226 is configured to identify a driver type with respect to currently available hardware (e.g., the first hardware). For example, the determining logic may be configured to identify the driver type for each of the respective functions of the 3D graphics processing engine. In the present embodiment, TnL in the first hardware is implemented in software, and thus its driver type is "fully software driver." Rasterizer is implemented in a combination of software and hardware, and thus its driver type is "partial hardware driver." Back-end processing is implemented in a hardware digital signal processor (DSP), and thus its driver type is "fully hardware driver."

The setting logic 228 is configured to load a current dispatch table based on information drawn from the unified dispatch table and the driver type. For example, in the present embodiment, the current dispatch table setting logic 228 loads a current dispatch table corresponding to the first hardware. The current dispatch table setting logic 228 uses the determined driver type of the first hardware and information from the unified dispatch table to load the current dispatch table. That is, address pointers in the unified dispatch table are respectively directed to the addresses of software and hardware involved when the first hardware fulfills each function.

The driving logic 230 is configured to drive corresponding hardware or software via particular accesses to the current dispatch table. The driving logic 230 uses address pointers stored in the current dispatch table to direct processing that implements the 3D graphics processing engine.

Using the unified driver apparatus 220 according to embodiments of the unified driving method and unified driver apparatus, a unified driver supporting multiple hardware configurations can be realized. The unified driver presents groups of function entries that implement the 3D graphics processing engine wherein a group corresponds to each of the one or more different hardware configurations.

Figure 4:
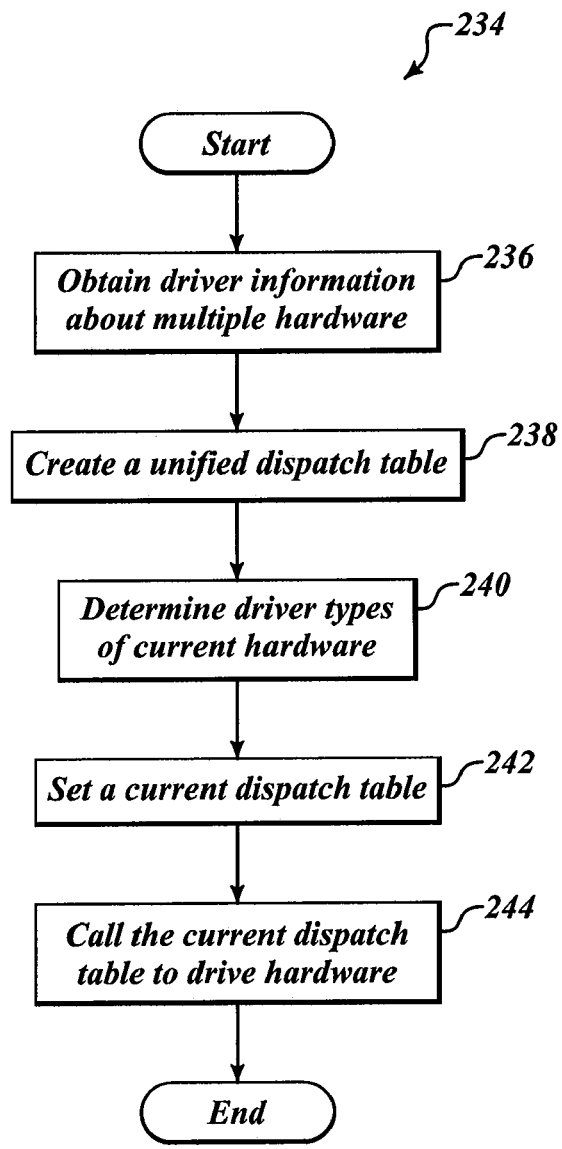
FIG. 4 is a schematic flowchart of a unified driving method according to an embodiment of the present invention.

According to one embodiment of the unified driving method and unified driver apparatus, an operating method of the unified driver apparatus 220 includes a unified driving method 234 as illustrated in FIG. 4. The unified driving method is now described with reference to FIG. 4.

FIG. 4 depicts a flowchart of a unified driving method 234 according to an embodiment of the unified driving method and unified driver apparatus. As shown in FIG. 4, the obtaining logic 222, via module 236, obtains respective driver information for multiple hardware configurations. The respective driver information indicates which hardware configurations the unified driving method will support.

In the present embodiment, description is given in a context wherein a unified driver can support first and second hardware configurations for performing 3D graphics processing. In the present embodiment, the first hardware configuration supports the implementation of a DSP, and the second hardware configuration is implemented fully in software. After obtaining the driver information related to the first and the second hardware configurations, the flow as shown in FIG. 4 transitions to module 238.

In module 238, the generating logic 224 creates a unified dispatch table according to the driver information obtained in module 236 and related to the multiple hardware configurations. In the embodiment of module 238, the unified dispatch table includes a rendering function column and an address pointer column. As described herein, the rendering function column is loaded with particular rendering function identifiers, and the address pointer column is loaded with address pointers of objects driven to fulfill the particular rendering functions. These rendering functions forward particular graphics states to hardware. That is, when the driver receives a high-level graphics state command from the application, it can send the proper target specific graphics state command to the proper hardware directly via information from the dispatch tables.

In module 238, the initialization phase of the unified driving method according to the embodiment of the unified driving method and unified driver apparatus is completed. Nevertheless, those skilled in the art will appreciate that the initialization phase can also be completed in other ways. For example, initialization may be completed by loading a configuration file directly. Hence, modules 236 and 238 are preferred but not essential for the unified driving method according to the embodiment of the unified driving method and unified driver apparatus.

In some embodiments, graphics states are implemented according to an OpenGL protocol. OpenGL is a standardized application programming interface (API) intentionally generic with respect to programming language and underlying hardware. That is, OpenGL function calls can be used in many software languages, and specific implementations supporting OpenGL have been developed for many hardware platforms. Broadly speaking, as known to those skilled in the art, OpenGL provides a common interface and methodology for producing two dimensional (2D) and 3D graphics.

OpenGL/ES is a version of OpenGL specifically for embedded systems. OpenGL/ES is not merely a subset of OpenGL, but many OpenGL/ES functions are similarly represented in OpenGL. In addition, other functions are implemented in OpenGL/ES and targeted specifically toward embedded systems such as mobile devices. Particular details related to OpenGL and OpenGL/ES are known to those skilled in the art and used in reference to the non-limiting embodiments described, however, the particular details are not required to implement the unified driving method and unified driver apparatus described herein.

In module 240, the determining logic 226 identifies a driver type with respect to currently available hardware (e.g., the first hardware) used for performing graphics functions. In the present embodiment, TnL of the first hardware is implemented in software (i.e., its driver type is "fully software driver"), rasterizer is implemented in a combination of software and hardware (i.e., its driver type is "partial hardware driver"), and back-end processing is implemented in a DSP (i.e., its driver type is "fully hardware driver").

In module 242, the setting logic 228 loads a current dispatch table based upon information previously loaded in the unified dispatch table and further based upon the driver type identified by the determining logic 226. For example, the setting logic 228 sets a current dispatch table corresponding to the first hardware. Specifically in the present embodiment, address pointers in the unified dispatch table are copied or mapped to software and hardware addresses of the first hardware when the first hardware will perform the graphics functions.

In module 244, the driving logic 230 accesses the current dispatch table in order to implement a 3D graphics processing engine. Particularly, the driving logic uses address pointers from the current dispatch table to implement individual graphics library states via processing in corresponding hardware or software.

The method illustrated in FIG. 4 can create a unified dispatch table including information from a plurality of different hardware configurations. In this way, the unified dispatch table works cooperatively with a single unified driver to implement a 3D graphics engine. The unified driver, via the unified dispatch table, supports a plurality of hardware implementations.

The unified driver can directly call the related rendering functions stored in the current dispatch table. The related rendering functions, which correspond to the currently available hardware, operate to update states and also operate to drive corresponding hardware or software in accordance with the dispatch table.

In OpenGL/ES, there are generally two kinds of commands; one for updating GL states and another for drawing objects. When GL states are updated with a "send an OpenGL/ES command," the driver uses one global rendering context to store the new value of the GL states, which include driver states, TnL states, and back-end and rasterizer states. The driver also activates a flag attached to the state to "validate" the state. When objects are drawn with "send a command to draw objects," the driver uses the new global rendering context to update the underlying hardware. If a GL state is validated, the rendering function will use the dispatch table to forward the GL states to specified hardware.

Figure 5:
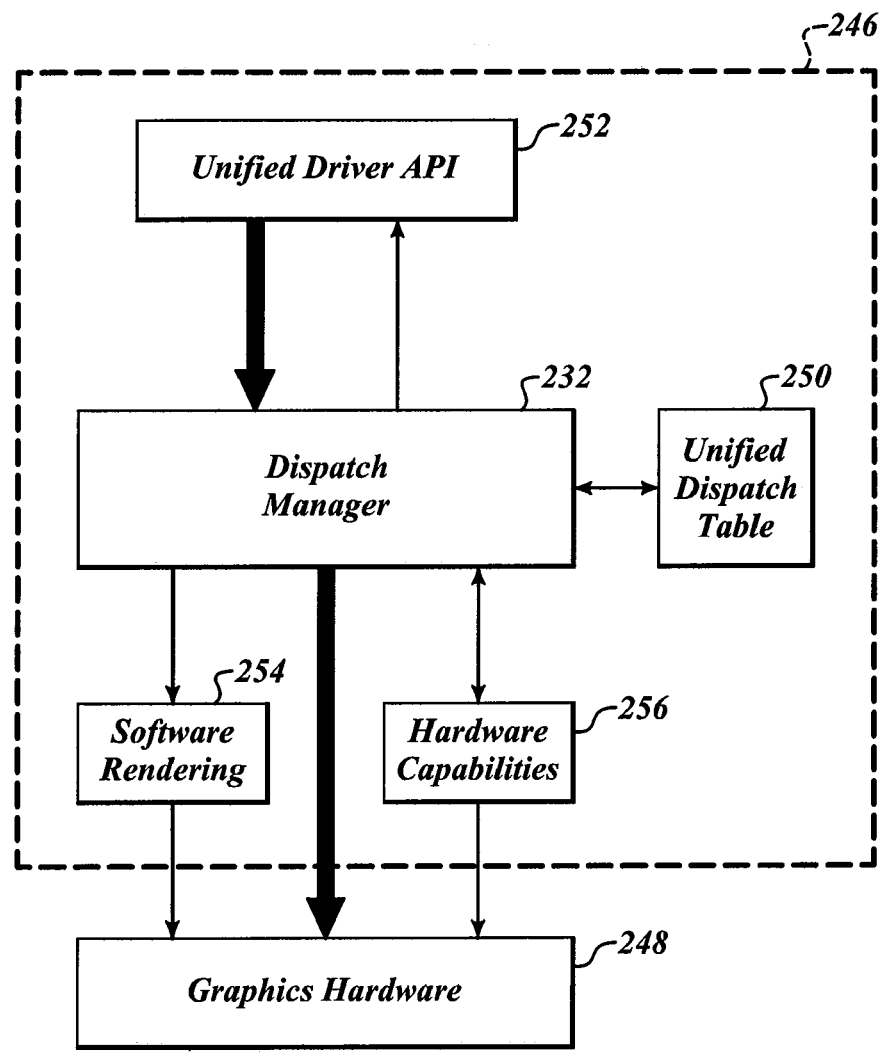
FIG. 5 illustrates the initialization and operation of a unified driver for 3D graphics processing.

FIG. 5 illustrates the initialization and operation of a unified driver for 3D graphics processing 246. A dashed line represents the boundaries of the unified driver 246, and it is understood that some elements illustrated within the boundaries of the driver may or may not be completely enclosed within the physical or virtual memory space as illustrated. A module of graphics hardware 248 may indicate a GPU, a display memory buffer, a display device, a dedicated graphics software module, or some combination thereof.

The unified driver 246 has a dispatch manager 232 that directs operations of a lower layer portion of the driver. Some functionality of the dispatch manager 232 of FIG. 5 has also been described with respect to FIG. 3. In the embodiment of FIG. 5, however, the dispatch manager 232 is shown having additional capabilities. For example, the dispatch manager 232 bi-directionally communicates with an upper layer portion of the driver 246, which is illustrated as the unified driver API 252.

The unified driver API 252 provides an interface for system software, applications software, and the like, which use the graphics capabilities of the device, e.g., GL states and GL commands from an OpenGL/ES protocol. Upon receipt of directions or requests from the system software, the unified driver API 252 substantially directs the operations of the dispatch manager 232 as illustrated by the heavy directional line from the unified driver API 252 to the dispatch manager 232. In some cases, as illustrated by the light directional line, the dispatch manager 232 may send control information or requests to the unified driver API 252.

Within the dispatch manager 232, a unified dispatch table 250 is cooperatively accessed. During initialization, the unified dispatch table 250 is loaded programmatically and in some cases, via access to a software configuration file, a hardware configuration file, the graphics hardware, or some combination thereof. As illustrated in FIG. 5, a software rendering module 254, a hardware capabilities module 256, or the graphics hardware 248 may provide information to initialize the unified dispatch table 250. Rendering functions may be used, for example, to forward GL states to the graphics hardware. In this way, when the unified driver receives a GL command through the unified driver API 252, the unified driver can send the proper commands to the proper hardware straightforwardly using the unified dispatch function tables 250.

During normal operation of the unified driver, the dispatch manager 232 acts as a conduit for commands directed by the upper layer system software and application software down to the graphics hardware 248. In some cases, the commands are analyzed, translated, or otherwise processed by the unified driver API 252, and in other cases, the commands are merely passed to the dispatch manager 232.

Upon receipt of commands, the dispatch manager 232 may further analyze, translate, and process the commands. Subsequently, as directed by information from the unified dispatch table 250, the dispatch manager 232 will carry out the task directed by the command.

For example, in some cases, a command translated from the unified driver API may direct the graphics hardware 248 to perform a particular TnL operation. The dispatch manager 232 will interrogate the unified dispatch table 250, and retrieve information indicating how the TnL is to be carried out. In some cases, the requested TnL operation may be rendered fully in software. In such cases, the dispatch manager 232 will direct the software rendering module 254 to carry out the task, and the software module will do so. The fully software operation is indicated in FIG. 5 by the directional arrows between the dispatch manager 232, the software rendering module 254, and the graphics hardware 248.

As another example, a command translated from the unified driver API may direct the graphics hardware 248 to perform a particular rasterization operation. In this case, the dispatch manager 232 will interrogate the unified dispatch table 250, and retrieve information indicating how the rasterization operation is carried out. In some cases, the requested rasterization operation may be rendered fully in hardware. In this case, the dispatch manager 232 will direct the hardware capabilities module 256 to carry out the task. The fully hardware operation is indicated in FIG. 5 by the directional arrows between the dispatch manager 232, the hardware rendering module 256, and the graphics hardware 248.

In still other cases, the dispatch manager receives commands from the unified driver API 252 and is directed by the unified dispatch table 250 to pass them to the graphics hardware directly or with only minor analysis, translation, or processing. In these cases, the unified driver is very efficient and uses only a small amount of computing resources.

Figure 6:
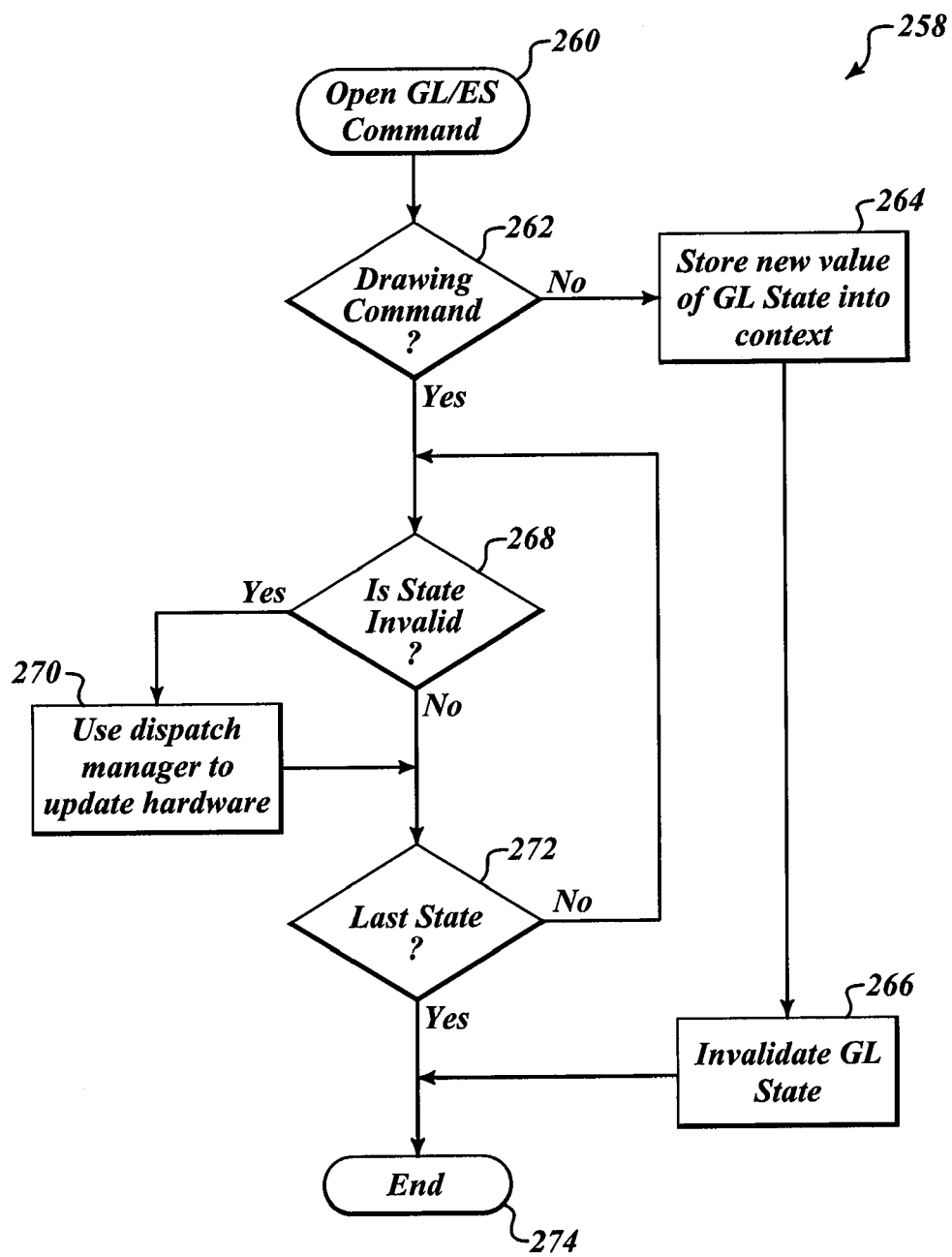
FIG. 6 illustrates an operational flowchart of an OpenGL/ES protocol program flow through a unified driver for 3D graphics processing.

FIG. 6 illustrates an operational flowchart 258 of an OpenGL/ES protocol program flow through a unified driver for 3D graphics processing. In the OpenGL/ES protocol, two types of commands are common. One type of command is for updating GL states, and another type of command is for drawing objects. At element 260, a unified driver API 252 passes an OpenGL/ES command. At element 262, the unified driver determines whether the command is an updating command or a drawing command.

If the command is an updating command, then the unified driver may use one global rendering context to store the new value of the GL states (e.g., driver states, TnL states, back-end processing states, and rasterizer states) as shown in element 264. In addition, an active flag may be attached to the new state so as to invalidate the previous state as shown in element 266. For updating commands, the operational program flow then ends at element 274.

If, at element 262, the unified driver determines that the command is a drawing command (e.g., glDrawElements, glDrawArray, or the like), the driver will first determine whether the current state is valid as shown in element 268. If the state is invalid and in need of updating, then the dispatch manager 232 will use the unified dispatch table 250 to update the hardware and thereby draw the desired objects at element 270.

If there are remaining states to be updated, as interrogated at element 272, then the program flow returns to element 268. If all states have been updated, then program flow ends as shown in element 274.

Referring to FIG. 7A, description is given herein to an example of a unified dispatch table such as the one created during the initialization phase (e.g., module 202 in FIG. 4 and element 250 in FIG. 5) of the method according to one embodiment. As shown in FIG. 7A, a unified dispatch table corresponding to the first and the second hardware is created in the initialization phase. The unified dispatch table includes a rendering function column and an address pointer column with address pointers to objects that will be called to fulfill the rendering function.

In one embodiment, a first hardware configuration is a low-end system wherein texture and lighting (TnL) is performed without any particular or dedicated hardware support. That is, in the first hardware configuration, the TnL processing is performed in software on the host CPU. Also in the embodiment, a second hardware configuration is a high-end system wherein TnL is performed on a dedicated processor such as a DSP. Moreover, for the sake of describing the non-limiting present embodiment, only the TnL processing in the first and the second hardware configurations are different. That is, the first and second hardware configurations in the present embodiment are the same except for the TnL processing.

During the initialization phase of the present embodiment, the first and the second hardware configurations are queried for information related to the TnL capabilities of the respective hardware configuration. Information related to whether the TnL functions are supported in fully software, a combination of software and hardware, or fully in hardware for each of the first and second hardware configurations is determined.

Similar to the TnL capabilities, information related to the rasterizer and back-end processing capabilities for each of the first and second hardware capabilities is also queried. In the present example, both the first hardware configuration and the second hardware configuration have the same rasterizer and back-end processing capabilities.

The information related to the capabilities for each of the rendering functions in the 3D graphics processing engine is used to create or update a unified dispatch table. In the unified dispatch table of the present embodiment it is known then that the TnL function will be supported either in hardware or software depending on which hardware is available—the first configuration or the second configuration.

Also in the unified dispatch table of the present embodiment, it is known that regardless of whether the first hardware configuration or the second hardware configuration is available, the rasterizer will be supported in the same way (e.g., fully software, partial software and partial hardware, or fully hardware). Similarly, in the unified dispatch table, it is known that regardless of whether the first hardware configuration or the second hardware configuration is available, the back-end processing function will be supported in the same way.

Next during initialization of the present embodiment, when setting a current dispatch table, a dispatch manager software component can load TnL rendering functions and corresponding driver address pointers in the unified dispatch table according to the TnL version (e.g., fully software or fully DSP hardware).

FIG. 7B shows a current dispatch table loaded according to the first hardware configuration (e.g., when the first hardware is available to operate on the mobile device). In the first hardware configuration, the TnL functions will be carried out fully in software on the host CPU. Accordingly, the dispatch manager 106 will fill in appropriate software rendering function pointers at the corresponding TnL entry points in the unified dispatch table. Later, during normal operation of the unified driver, the TnL states will not be forwarded to hardware. Instead, since the first hardware configuration implements a fully software TnL driver, all of the GL states can be directly obtained from the global rendering context structures.

Figures 7C, 8:
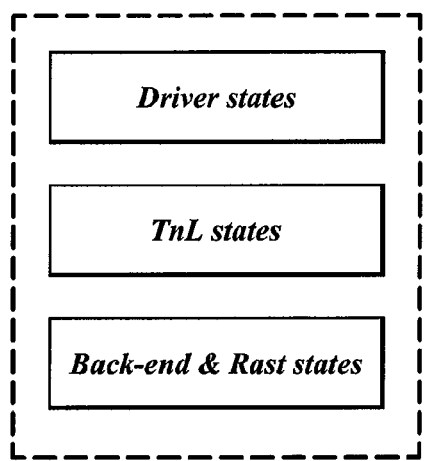
FIG. 7C is a schematic view of a current dispatch table set for another hardware as currently installed hardware using the method according to the embodiment of the present invention.
FIG. 8 is a schematic view of global rendering context division.

Alternatively, if the currently installed hardware corresponds to the second hardware configuration, then the dispatch manager 106 will fill in the unified dispatch table with appropriate hardware rendering function pointers. The TnL driver in the second hardware configuration is supported on a DSP. Accordingly, as shown in FIG. 7C, the unified dispatch table will be loaded with pointers to hardware operations. Later, during normal operation of the unified driver under the second hardware configuration, the TnL states will be forwarded to hardware. That is, in the second hardware configuration, the TnL GL states are not directly obtainable from the global rendering context because the host CPU that hosts the unified driver is a different processor from the DSP that implements the TnL graphics functions. Accordingly, when the second hardware configuration is the available hardware, appropriate TnL GL states will be converted into 32-bit commands in hardware rendering functions, and the 32-bit commands will be forwarded to a CMD interface. With reference back to FIG. 3, a driving logic parses the 32-bit commands and updates local TnL states using the 32-bit commands obtained from the CMD interface.

Optionally, the structure and processing flow of the unified driver apparatus may be simplified in some embodiments. For example, driver operations that correspond to each of the functions that are implemented by hardware and supported by the unified driver may be further listed in the dispatch table. Accordingly, for different hardware configurations, different processors are used to implement each of the specific functions (e.g., TnL), but the operational processing steps that carry out the function on each of the different processors is generally identical. In other words, the operational processing steps each correspond to the same function or program so as to accomplish the same task. In this way, a corresponding driver operation can be shared among different hardware types, so that the software development cycle, software maintenance, and software management for the particular unified driver may be re-used.

To support the simplification, an additional driver operation column is added to the unified dispatch table illustrated in FIG. 7A. Along with the address pointer column of FIG. 7A, which stores pointers to particular functions, the additional column indicates driver operations required for all functions.

The driver operation column in the dispatch table as shown in FIG. 7A includes: driver operation A1 corresponding to TnL, driver operation A2 corresponding to rasterizer, and driver operation A3 corresponding to back-end processing. Using the same driver operation performed among different hardware, the TnL functions in the first and the second hardware configurations can share driver operation A1. Similarly, the rasterizer functions can share driver operation A2, and the back-end processing functions can share driver operation A3.

With respect to the dispatch table in FIG. 7B, TnL operations of the first hardware configuration are performed fully in software. Accordingly, the pointer in the address pointer column related to TnL driver operation A1 points to the address of a software function executed only on the CPU of the mobile device (i.e., performance address a). The rasterizer function in the first hardware configuration is implemented in a combination of software and hardware. Accordingly, the pointer in the address pointer column related to rasterizer driver operation A2 points first to the software performance address a and second to the hardware operation address b. Finally, the back-end processing function in the first hardware configuration is implemented fully in hardware. Thus, the pointer in the address pointer column related to the back-end processing function driver operation A3 points to operation address b of the first hardware.

Processing is similarly conducted for the second hardware configuration as indicated in the dispatch table in FIG. 7C. In the second hardware configuration, TnL operations are implemented with a dedicated processor such as DSP. Correspondingly, the pointer in the address pointer column of FIG. 7C related to TnL driver operation A1 points to performance address c. Rasterizer operations in the second hardware configuration perform driver operation A2. Accordingly, the pointer in the address pointer column related to the rasterizer function points to the software performance address a and operation address c of the second hardware configuration. Also, since the back-end processing function in the second hardware configuration is fully implemented in hardware, the pointer in the address pointer column related to the back-end processing driver operation A3 points to operation address c of the second hardware configuration.

The dispatch table entry sharing described with respect to FIGS. 7A-7C is limited in some cases when local pointers are used. That is, when local pointers are used, the situation arises wherein some pointers are only valid at particular times. For example, if local pointers that represent the input of TnL states are used, then the local pointers will only be valid during the TnL stage of unified driver processing. In order to make the dispatch table entries more readable and useful, it is preferable in some embodiments to reorganize the global rendering context.

As shown in the embodiment of FIG. 8, a global rendering context is divided into three member structures: driver states, TnL states, and back-end processing and rasterizer states. In one embodiment, fifteen or more functions implement the TnL states, 10 or more functions implement the back-end processing states, and 4 or more functions implement the rasterizer states. In addition, multiple data structures can be created to implement each of the three member structures.

When a global rendering context is provided in this way, the called driver operation then has only one member structure as an input parameter. As permitted in many suitable programming functions, member structures may be overloaded with several different copies of member elements by declaring multiple functions or structures with a same name and scope. Accordingly, a single structure can be used to provide address pointers for multiple graphics configurations.

In the host CPU, a called software operation can directly use TnL states in the global rendering context to retrieve input parameters. Alternatively, for TnL functions implemented via a DSP, the CMD interface will receive the 32-bit TnL commands and update TnL states in the DSP. In the DSP implementation, the TnL states of the DSP are effectively a copy of the TnL states of the global rendering context. An implementation of the global context is described with respect to the first hardware configuration and the second hardware configuration of TnL functions. For a fully software implementation of a TnL driver, a particular TnL function is triggered by drawing commands. In addition, new bit true rasterizer commands will be created and forwarded to a rasterizer CMD interface. For a DSP implementation of a TnL driver, particular drawing commands will trigger a transfer of TnL states in the global rendering context to the DSP once all of the states have been updated. Subsequently, a corresponding function will be called in the DSP. In addition, a rasterizer command generated in TnL core will be directly forwarded to the CMD interface. The rasterizer stage will then use the rasterizer states from the unified driver global rendering context and TnL stages to get object fragments, which will subsequently be rendered in the back-end processing stage.

Figure 9:
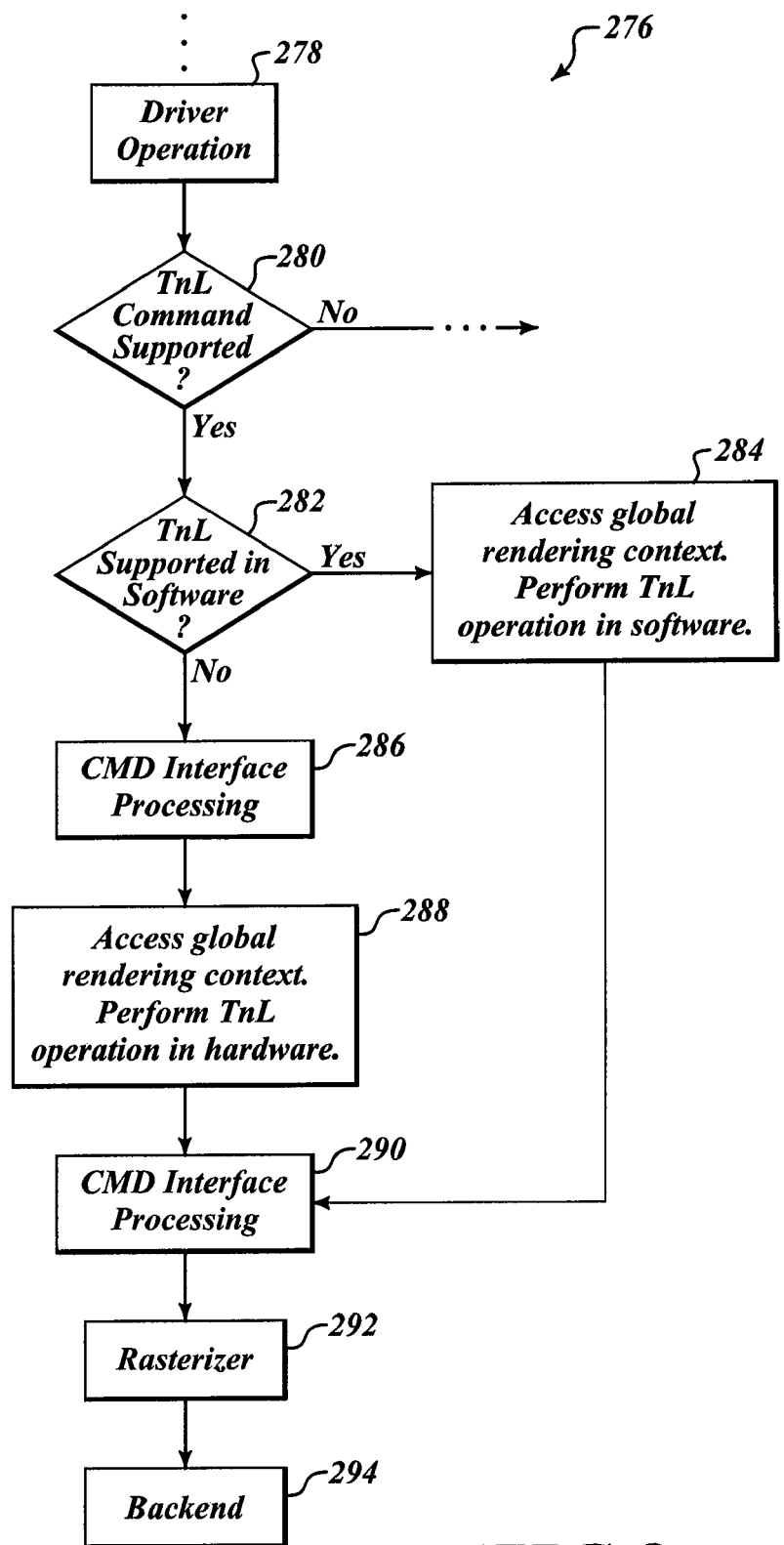
FIG. 9 illustrates another implementation of a unified driver for 3D graphics processing.

FIG. 9 illustrates another implementation of a unified driver for 3D graphics processing 276. In the embodiment of FIG. 9, only a subset of the processing of the driver 276 is shown. As the driver is operating, a particular TnL command has been directed.

At element 278, the processing of the unified driver is examined. A particular TnL command has been directed, so the driver interrogates its function set at element 280 to determine if the TnL command is supported. If the particular TnL command is not supported, then processing at this stage of the driver is concluded and control returns via another portion of the driver 276. If the TnL command is supported, then the particular type of support is interrogated to determine how the particular TnL command is implemented on the mobile device.

During initialization, the dispatch function table has been configured. If a fully software TnL is supported on the host CPU (element 282), then the dispatch function table will be filled with software rendering function pointers. That is, for the particular TnL function that has been directed, an address pointer to a software function will be retrieved. Accordingly, the driver will not forward any TnL GL states to hardware since the current GL states can be retrieved directly from the global rendering context as illustrated and described with respect to FIG. 8, and as indicated at element 284 of FIG. 9.

Alternatively, TnL is supported fully in hardware, e.g., on a DSP, then the dispatch function table will be filled with hardware rendering function pointers. In this type of implementation, the TnL GL states will not be directly accessible in the global rendering context because the host CPU and the DSP are different processors. Accordingly, the global rendering context will point to a different memory space than on the host CPU. This information is indicated in the global dispatch table for the particular unified driver for 3D graphics processing implementation.

When the global dispatch table indicates that the global rendering context points to off-host memory space, then these relevant GL states will be converted commands for the off-host processor. For example, if the TnL functions are implemented in a separate DSP, the commands may be 32-bit commands that direct hardware rendering functions on the DSP. The 32-bit commands will be forwarded or otherwise passed to a CMD interface. In FIG. 9, this is indicated in element 286.

The CMD interface illustrated as element 286 carries out at least two tasks. First, 32-bit commands are parsed. Second, TnL states on the DSP are updated.

After the 32-bit commands are parsed and the TnL states are updated at element 286, then the directed TnL function can be carried out. At element 288, the particular TnL function is executed on the DSP hardware. The software routines and instruction codes executed at element 288 are in some cases very similar or even identical to the instructions executed at element 284. Changes between the software at elements 288 and 284 are often only a result of the different processor architectures and the different memory spaces. Nevertheless, the functions are generally related closely. Accordingly, it may be possible to share much of the software code development time, maintenance time, and management.

In the embodiment illustrated in FIG. 9, a fully software TnL implementation may further be supplemented with hardware based rasterizer and back-end functionality. After the TnL functionality updates the global rendering context GL states, then new bit true rasterizer commands can be created in this module and forwarded to another CMD interface at element 290. The 32-bit rasterizer commands are parsed and the rasterizer states are updated at element 292. Similarly, in a DSP implementation of the particular TnL drawing commands (element 288) may trigger transferring TnL states from the global rendering context to the DSP. After the particular GL states are updated, software functions that execute on the DSP can be executed.

In the embodiment of FIG. 9, rasterizer commands generated in the TnL element 288 will be forwarded through the CMD interface at element 290. The rasterizer element at 292 will use the rasterizer GL states and TnL states from the driver to retrieve and update object fragments, manipulate the object fragments, and otherwise process the objects to be rendered. At element 294, the particular objects will be rendered with a back-end stage, typically for subsequent display.

The preceding embodiments describe examples of a unified driving method and unified driver of a 3D hardware acceleration embodiment for handheld devices. The embodiments permit one driver to be adaptable for different combinations of 3D graphics architectures. Moreover, a configuration file, e.g., a unified dispatch table, which is read during an initialization phase of the 3D engine, allows a convenient switching of the different combinations. The configuration file makes it simple and convenient to add new hardware.

The unified driving method and unified driver apparatus according to the unified driving method and unified driver apparatus permits simple configuration of a 3D graphics engine for handheld devices. Using the unified driving method and unified driver apparatus, it becomes much easier and more convenient to reallocate resources of handheld devices. Further the performance of handheld devices is improved. Additionally, since large manpower and material resources are no longer required for version control and release management, those resources can be allocated for other tasks related to the development of handheld devices such as performance optimization and the development of new features.

Using the method and apparatus described herein, multiple hardware configurations can be driven simply by one unified driver. As a result, the unified driver's application scope is expanded, and the system's utilization rate is enhanced. In addition, since the unified driver may be implemented with one context, the management, the updating, and the debugging can just focus on this one context. As a result, the complexity of the unified driver method and device is reduced while the stability and reliability is raised.

The unified driving method and unified driver apparatus can be implemented in hardware, software, firmware, or a combination thereof. Those skilled in the art will appreciate that the unified driving method and unified driver apparatus may also be embodied in a computer program product arranged on a carrier medium to be used for any proper data processing system. Such signal carrier medium may be a transmission medium or a recordable medium used for machine-readable information, including a magnetic medium, optical medium or other proper medium. Examples of a recordable medium include a magnetic disc or floppy in a hard disc drive, an optical disc for an optical drive, a magnetic tape, and other media those skilled in the art can conceive. Those skilled in the art would further appreciate that any communication device with proper programming logic can perform the flow of the method of the unified driving method and unified driver apparatus, as embodied in a program product, for example.

As the present invention has been described with reference to contents currently believed to be the embodiments, it is to be understood that the present invention is not limited to the disclosed embodiments. Instead, the present invention is intended to cover various modifications and equivalent schemes within the concept and scope of the appended claims. The following scope of the claims conforms to the broadest interpretation, so as to include all such modifications, equivalent structures and functions.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A unified device driving method executed in a handheld electronic device, comprising:
   determining a driver type, the driver type representative of a currently available hardware module on the handheld device the determining a driver type including at least one of:
   determining that a plurality of functions performed by the unified device driving method are performed fully in the currently available hardware module;
   determining that the plurality of functions performed by the unified device driving method are performed in a combination of hardware and software: and
   determining that the plurality of functions performed by the unlined device driving method are performed fully in software without participation of hardware;
   loading, in response to determining said driver type, a plurality of current dispatch table address pointers into a unified dispatch table, the unified dispatch table providing sufficient storage for at least two address pointers for each of a plurality of different hardware configurations, the loading the unified dispatch table including:
   setting, a first current dispatch table address pointer of the plurality of current dispatch table address pointers to an address of a first function of the plurality of functions when the first function is executable fully in the currently available hardware module;
   setting a second current dispatch table address pointer of the plurality current dispatch table address pointers to an address of a second function of the plurality of functions when the second function is executable in the combination of the hardware and software; and
   setting a third current dispatch table address pointer of the plurality of current dispatch table address pointers to an address of a third function of the plurality of functions when the third function is executable fully in the software;
   making the current dispatch table address pointers from the unified dispatch table available to a central processing unit; and
   driving the currently available hardware module with the plurality of functions, each of the plurality of functions associated with one of the plurality of current dispatch table address pointers loaded in the unified dispatch table.

2. The method according to claim 1, further comprising:
   obtaining the plurality of current dispatch table address pointers for a plurality of different hardware configurations supported by said unified device driving method; and
   generating said unified dispatch table using said plurality of current dispatch table address pointers.

3. The method according to claim 2 wherein the obtaining the plurality of current dispatch table address pointers includes obtaining at least two sets of the current dispatch table address pointers to functions of the plurality of functions wherein each set of the current dispatch table address pointers represents addresses to functions of the plurality of functions accessible by each of the plurality of different hardware configurations respectively.

4. The method according to claim 1 wherein said unified dispatch table is organized according to a function column and an address pointer column, wherein the function column provides for storage of an identifier for each function of the plurality of functions accessible by each of the plurality of different hardware configurations respectively, and the address pointer column provides for storage of address pointers to objects, the objects implementing said plurality of functions.

5. The method according to claim 4 wherein said unified dispatch table is further organized according to a driver operation column, wherein the driver operation column provides for storage of identifiers indicating driver operations corresponding to the plurality of functions supported by the unified driving method such that the plurality of different hardware configurations share corresponding driver operations indicated by the identifiers.

6. The method according to claim 1 wherein the unified device driving method is a three-dimensional (3D) graphics processing method.

7. The method according to claim 6 wherein the loading includes:
   loading a current dispatch table address pointer of the plurality of current dispatch table address pointers to a transform and lighting (TnL) function;
   loading a current dispatch table address pointer of the plurality of current dispatch table address pointers to a rasterization function; and
   loading a current dispatch table address pointer of the plurality of current dispatch table address pointers to a back-end processing function.

8. The method according to claim 1 wherein the determining and the loading includes:
   uploading the unified dispatch table from a memory.

9. A mobile device, comprising:
   a hardware module, the hardware module controllable with software;
   a memory having an area for instructions and an area for data structures;
   a central processing unit (CPU) operable to execute instructions stored in the memory area for instructions, the instructions forming a unified driver configured to control the hardware module when the CPU executes the instructions, the control including:
   initializing a unified dispatch table configured in the memory area for data structures, the unified dispatch table representing a plurality of columns of function identifiers and a plurality of columns of address pointers;
   loading the unified dispatch table with at least one set of function identifiers in the memory area for data structures associated with the plurality of columns of function identifiers; and
   loading the unified dispatch table with at least one set of address pointers in the memory area for data structures associated with the plurality of columns of address pointers, wherein each address in the set of address pointers represents an address of at least one function of a plurality of functions executable to control the hardware module; and
   a dispatch manager implemented in a subset of the instructions stored in the memory area for instructions, the dispatch manager having instructions to further control the hardware module when the CPU executes the instructions, the further control including:
   using a function identifier of the at least one function as an index into the unified dispatch table;
   retrieving an address pointer of the at least one set of address pointers from the unified dispatch table;
   retrieving a driver operation indicator from the unified dispatch table; and making the address pointer available to the CPU if the driver operation indicator is a fully software driver operation indicator: or making, the address pointer available to the CPU and passing another address pointer of the at least one set of address pointers to the hardware module if the driver operation indicator is a combination software and hardware driver operation indicator; or passing the address pointer to the hardware module if the driver operation indicator is a fully hardware driver operation indicator.

10. The mobile device according to claim 9, further comprising:

the dispatch manager having instructions to further control the hardware module when the CPU executes the instructions, the further control including:

accessing the unified dispatch table;

processing requests and directions passed via a unified driver applications programming interface (API);

retrieving information from a software rendering module;

retrieving information from a hardware capabilities module;

passing commands to the software rendering module; and passing commands to the hardware module.

11. The mobile device according to claim 9 wherein processing requests and directions includes generating 32-bit commands and passing commands includes passing the 32-bit commands through a command interface.

12. The mobile device according to claim 9, further comprising:

the dispatch manager having instructions to further control the hardware module when the CPU executes the instructions, the further control including:

forming a global rendering context in the memory area for data structures, the global rendering context having pointers into the unified dispatch table; and passing the global rendering context as an input parameter to each function of the plurality of functions executable to control the hardware module.

13. The mobile device according to claim 12 wherein the global rendering context further has pointers to global data structures accessible by the CPU.

14. The mobile device according to claim 9 wherein loading the unified dispatch table with at least one set of address pointers includes:

accessing a first current dispatch table associated with a first potential hardware module;

accessing a second current dispatch table associated with a second potential hardware module; and loading the unified dispatch table with address pointers associated with the hardware module in response to accessing the first and second current dispatch tables.

15. The mobile device according to claim 9 wherein the unified driver is a unified three-dimensional (3D) graphics processing driver.

16. The mobile device according to claim 15 wherein the unified three-dimensional (3D) graphics processing driver implements a protocol conforming to an OpenGL/ES graphics standard.

17. A non-transitory computer-readable medium whose contents configure a mobile device to provide unified driver functionality by performing a method, the method comprising:

initializing a unified dispatch table, the unified dispatch table representing a plurality of columns of function identifiers and a plurality of columns of address pointers;

loading the unified dispatch table with at least one set of function identifiers associated with the plurality of columns of function identifiers; and loading the unified dispatch table with at least one set of address pointers associated with the plurality of columns of address pointers, wherein each address in the set of address pointers represents an address of at least one function of a plurality of functions executable to control a hardware module;

using a function identifier of the at least one function as an index into the unified dispatch table;

retrieving an address pointer of the at least one set of address pointers from the unified dispatch table;

retrieving a driver operation indicator from the unified dispatch table; and making the address pointer available to a central processing unit (CPU) if the driver operation indicator is a fully software driver operation indicator: or making the address pointer available to the CPU and passing another address pointer of the at least one set of address pointers to the hardware module if the driver operation indicator is a combination software and hardware driver operation indicator; or passing the address pointer to the hardware module if the driver operation indicator is a fully hardware driver operation indicator.

* * * * *